United States Patent Office

2,824,136
Patented Feb. 18, 1958

2,824,136
PREPARATION OF ORGANIC SULFENYL BROMIDES

Joseph Nils Ospenson, Concord, Calif., assignor to California Spray-Chemical Corporation, Richmond, Calif., a corporation of Delaware No Drawing. Application October 14, 1955
Serial No. 540,628

4 Claims. (Cl. 260—543)

This invention relates to a new and improved method of preparing organic sulfenyl bromides.

Heretofore, the production and application of sulfenyl bromides have been restricted to a few isolated compounds by reason of the difficulties in their preparation in contrast to the comparative ease of preparation of the corresponding chlorides. In many instances, certain classes of organic sulfenyl bromides have been unattainable, although their sulfenyl chloride counterparts are easily prepared through classical reaction methods.

In accordance with the present invention, a generalized method of preparing organic sulfenyl bromides has been developed which permits the direct production of the organic sulfenyl bromides from the corresponding sulfenyl chlorides. This unique process involves the reaction of an organic sulfenyl chloride with hydrobromic acid in an aqueous system to yield the corresponding sulfenyl bromide in accordance with the following generalized reaction:

$$R-S-Cl + HBr(aq.) \rightarrow R-S-Br + HCl$$

The reaction does not appear to be critical to the type of organic substituent designated by R and has been found applicable to compounds wherein R may be either aliphatic or aromatic. Additionally, in certain types of molecules, the reaction with aqueous hydrobromic acid will not only effect the exchange from sulfenyl chloride to bromide, but will also effect nuclear substitution; as, for example, in the reaction of trichloromethane sulfenyl chloride with aqueous hydrobromic acid to yield not only the trichloromethane sulfenyl bromide, but also the dichloromonobromo-, monochlorodibromo- and tribromomethane sulfenyl bromides, depending upon the reaction conditions.

The process variables and conditions of reaction may be varied over a considerable range, with the optimum conditions for rate and yield dependent upon the nature of the sulfenyl chloride charged. For optimum conversion, in all cases an excess of the stoichiometric quantities of hydrobromic acid has been employed, and the amount of excess HBr varies for different starting materials. Probably, the most controlling factor in determining the optimum conditions of reaction is the Br⁻/Cl⁻ ratio in the aqueous phase of the reaction. Thus, the conversion and rate of reaction are increased with increase in the Br⁻/Cl⁻ ratio. This ratio may be increased by employment of large excess of hydrobromic acid which may be introduced initially to the reaction or intermittently by periodic removal of the aqueous phase and addition of fresh hydrobromic acid. Alternatively, the removal of chloride ion as it is formed also helps to maintain a favorable Br⁻/Cl⁻ balance. This removal occurs to some extent in the reaction due to higher volatility and lower solubility of the hydrochloric acid in the aqueous phase.

Generally, temperatures within the range of −10° to +130° C. have been employed in the process, and the choice of pressures is again dictated by the optimum Br⁻/Cl⁻ ratio consistent with the pressure effect on the other variables of the reaction. Although subatmospheric and superatmospheric pressures are contemplated, the use of atmospheric pressures has been found to result in satisfactory yields and rates of reaction.

The hydrobromic acid reactant may be introduced to the reaction either through the introduction of anhydrous HBr into an aqueous dispersion of the organo sulfenyl chloride, or as an aqueous solution of hydrobromic acid. Various experiments have been conducted employing varying concentrations of hydrobromic acid with the conclusion that, although the concentration of hydrobromic acid was not critical to the operability of the process, the maximum yields and rate of reaction were obtained with the highest concentration of hydrobromic acid. For practical application, it is preferred to employ the concentrated hydrobromic acid of commerce which is a constant-boiling solution containing 48% HBr.

In order to illustrate the versatility of the reaction process of the invention as it applies in the production of representative types of organo sulfenyl bromides, the following examples are presented. It is to be understood that these examples are presented merely as illustrations of the basic reaction process and may be modified for application to other charge compounds in accordance with the above disclosure.

Example 1

A monochloromethane sulfenyl chloride was prepared according to Brintzinger, Chem. Ber., 83, pages 87–90 (1950). It was obtained as a yellow oil with a

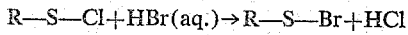

$d\frac{20}{4}$ of 1.50 and a refractive index $n_D^{21}$ of 1.5385.

58.3 g. of the resulting compound were added slowly to 162 g. of 48% aqueous hydrobromic acid maintained at 5° to 10° C. with agitation. After 15 minutes' agitation at 15° to 18° C., the resulting immiscible, clear red oil phase was separated, washed twice with ice water, and dried over sodium sulfate. This was filtered and the clear red oil obtained deposited some crystals after 15 minutes. The mixture was cooled in a Dry Ice-acetone bath for one-half hour and filtered cold. The resulting crude monochloromethane sulfenyl bromide was obtained as a clear red filtrate and possessed a density of 1.89 and a refractive index $n_D^{27}$ of 1.600.

Example 2

100 ml. of carbon tetrachloride were introduced into a reaction flask containing 20 g. of 2,4-dinitrobenzene sulfenyl chloride (melting point, 94° to 96° C.), and 100 ml. of 48% aqueous hydrobromic acid were added. The reaction mixture was refluxed for 4 to 6 hours. Thereafter, the aqueous layer was removed and an additional 100 ml. of 48% aqueous hydrobromic acid were added, and the reaction mixture again refluxed for an additional 4 to 6 hours.

After cooling, the mixture was filtered and the carbon tetrachloride layer separated. The carbon tetrachloride layer was concentrated and the total solids combined and recrystallized twice from carbon tetrachloride. The resulting 2,4-dinitrobenzene sulfenyl bromide appeared as yellow-orange crystals with a melting point of 105° to 107° C., on which the following analysis was obtained:

|   | Found, Percent | Calculated, Percent |
|---|---|---|
| C | 26.2 | 25.8 |
| Cl | 0 | 0 |
| Br | 29.1 | 28.7 |
| S | 11.09 | 11.45 |
| N | 9.83 | 10.03 |
| H | 1.38 | 1.07 |

Example 3

186 g. of 96% trichloromethane sulfenyl chloride (.96 mole) were added to 972 g. of 48% hydrobromic acid (6 moles) and agitated for 2 hours. At this point, the specific gravity of the nonaqueous phase was 2.28. The red oil phase was then separated and 236.8 g. of reaction product were recovered, indicating a crude yield of 90 to 95% based on trichloromethane sulfenyl chloride charged.

The reaction product was then washed twice with water, dissolved in ether, and dried over anhydrous sodium sulfate, followed by filtering and stripping to a pot temperature of 65° C. at 25 mm. mercury. 200 g. of product were obtained with a specific gravity of 2.51. This product was then fractionated twice to yield pure trichloromethane sulfenyl bromide and monobromodichloromethane sulfenyl bromide. The trichloromethane sulfenyl bromide possessed a boiling point of 40.5° C. at 1.6 mm. mercury, with an $n_D^{20}$ equal to 1.5842 and $$d\frac{20}{4}$$

of 2.05. The monobromodichloromethane sulfenyl bromide possessed a boiling point of 46.6° C. at 1.1 mm. mercury, with an $n_D^{20}$ equal to 1.6297 and a $$d\frac{20}{4}$$

equal to 2.38.

Example 4

37.2 g. of 96% trichloromethane sulfenyl chloride were added to 200 g. of 48% aqueous hydrobromic acid and agitated for 6 hours. The oily phase was separated and 200 g. of additional aqueous hydrobromic acid were added and agitated for another 6 hours, at which point the specific gravity of the nonaqueous phase was 2.82. The red oily phase was separated, indicating a yield of 80 to 85%.

The reaction product was then washed and dried as in the previous example and fractionated to yield dibromomonochloromethane sulfenyl bromide and tribromomethane sulfenyl bromide. The dibromomonochloromethane sulfenyl bromide possessed a boiling point of 55.8° C. at 0.6 mm. mercury, with an $n_D^{20}$ equal to 1.6714 and a $$d\frac{20}{4}$$

equal to 2.67. The tribromomethane sulfenyl bromide possessed a boiling point of 63.6° C. at 0.4 mm. mercury, with an $n_D^{20}$ of approximately 1.72 and a $$d\frac{20}{4}$$

equal to 3.01.

Obviously, many modifications and variations of the invention, as hereinbefore set forth, may be made without departing from the spirit and scope thereof, and therefore only such limitations should be imposed as are indicated in the appended claims.

I claim:

1. The process for the production of an organo sulfenyl bromide which comprises reacting an organo sulfenyl chloride, in which the sulfenyl chloride radical is at least the primary reactive group, with an aqueous solution of concentrated hydrobromic acid and recovering the resulting organo sulfenyl bromide.

2. The process for the production of organo sulfenyl bromides which comprises reacting an organo sulfenyl chloride, in which the sulfenyl chloride radical is at least the primary reactive group, with an excess of the stoichiometric quantities of hydrobromic acid in an aqueous medium and recovering the resulting organo sulfenyl bromide.

3. The process for the production of a halomethane sulfenyl bromide which comprises reacting a halomethane sulfenyl chloride with concentrated hydrobromic acid and recovering the resulting halomethane sulfenyl bromide.

4. The process for the production of tribromomethane sulfenyl bromide which comprises reacting trichloromethane sulfenyl chloride with a stoichiometric excess of hydrobromic acid in an aqueous medium and recovering the resulting tribromomethane sulfenyl bromide.

References Cited in the file of this patent

Houben Weil: 4th edition, vol. 9, Sulfur Selenium and Tellurium Compounds, pp. 267, 268; 1952.